United States Patent [19]
Baker et al.

[11] 3,763,767
[45] Oct. 9, 1973

[54] SMOKING OF FOOD PRODUCTS

[75] Inventors: Harvey O. Baker, Fort Wayne; Johan E. Hoff, West Lafayette, both of Ind.

[73] Assignee: Eckrich, Peter, & Sons, Inc.

[22] Filed: June 30, 1971

[21] Appl. No.: 158,545

Related U.S. Application Data

[62] Division of Ser. No. 829,285, June 2, 1969, Pat. No. 3,615,729.

[52] U.S. Cl................ 99/476, 55/315, 99/470, 99/482
[51] Int. Cl..... A23b 1/04, A47j 36/38, B01d 50/00
[58] Field of Search.............. 99/259, 260, 261, 99/262, 353, 229, 467–468, 469–470, 471–472, 473–474, 475–476, 477–478, 479–480, 481–482, 340, 443; 126/59.5; 252/359, 359 A

[56] References Cited
UNITED STATES PATENTS

| | | | |
|---|---|---|---|
| 2,311,199 | 2/1943 | Astradsson | 252/359 R UX |
| 2,364,199 | 12/1944 | Derr | 252/359 R |
| 3,125,017 | 3/1964 | Tauber et al. | 99/261 X |
| 3,161,985 | 12/1964 | Fiske et al. | 252/359 X |
| 3,288,054 | 11/1966 | Weprin et al. | 99/261 X |
| 3,393,629 | 7/1968 | McBrady | 99/261 X |
| 3,485,769 | 12/1969 | Pakula | 252/359 A |
| 3,500,743 | 3/1970 | Cameron | 99/353 |

*Primary Examiner*—Wayne A. Morse, Jr.
*Assistant Examiner*—Arthur O. Henderson
*Attorney*—Hofgren, Wegner et al.

[57] ABSTRACT

Apparatus for generating a reduced carcinogen content smoke aerosol for use in the smoking of food products. A housing having a smoke regeneration zone therein and a gas outlet for regenerated smoke is provided. The zone is heated and a system is included for introducing and dispersing a liquid smoke composition within the heated zone, the heat reducing the carcinogen content of the resulting smoke aerosol. The apparatus may further include a system for providing the lowered carcinogen content liquid smoke for use in regeneration by the apparatus above, which additional system includes a conventional smoke generator, a small cyclone capable of separating the particulate phase of the smoke from the vapor phase thereof and condensing apparatus.

2 Claims, 2 Drawing Figures

United States Patent [19]
Baker et al.
[11] 3,763,767
[45] Oct. 9, 1973
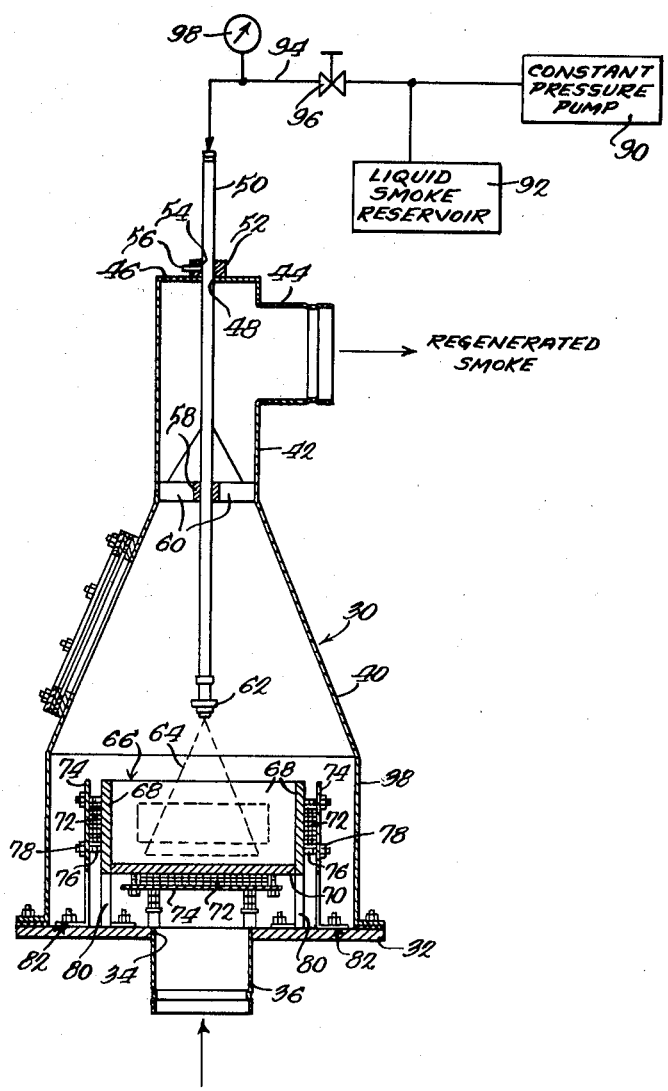

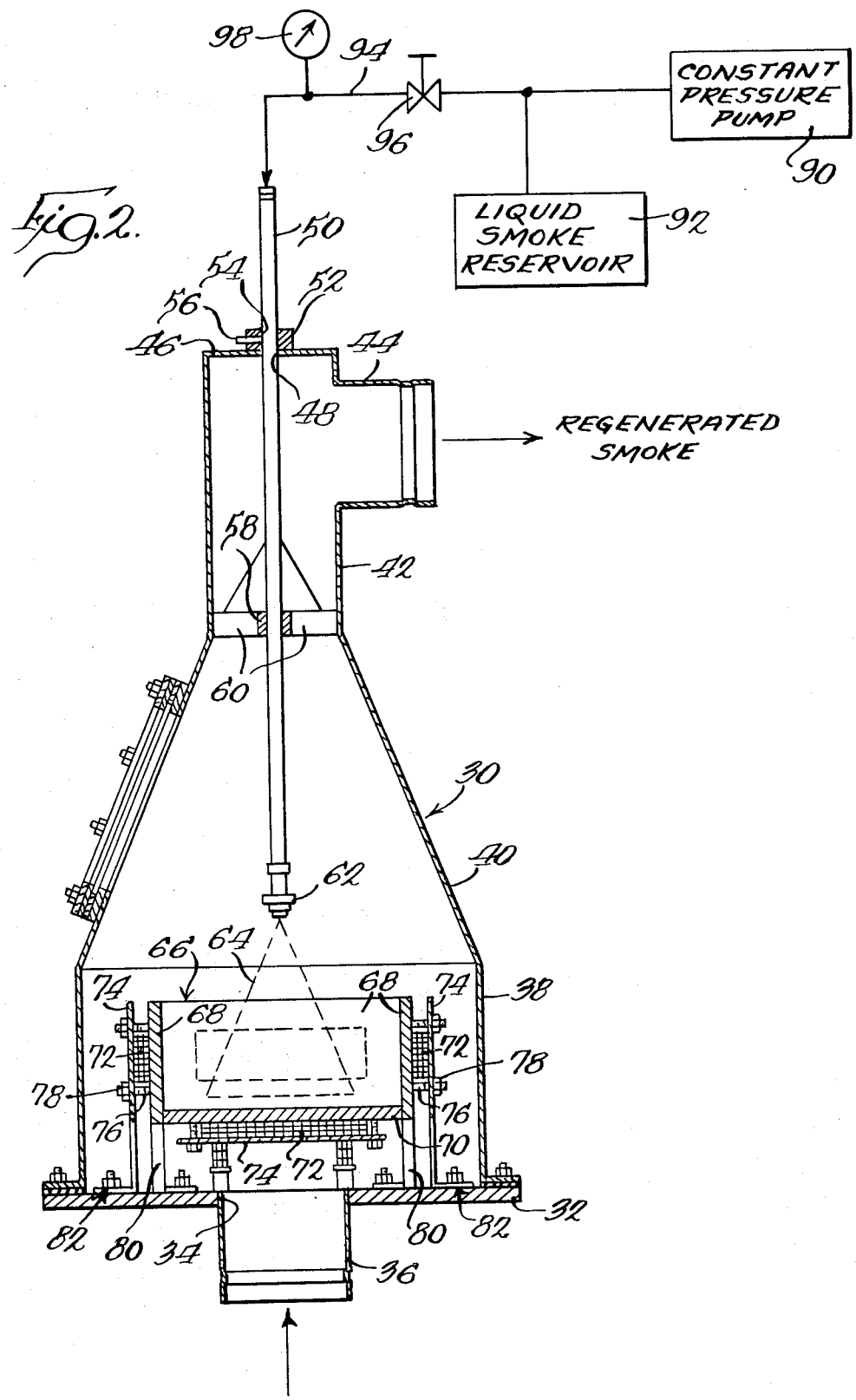

SMOKING OF FOOD PRODUCTS

CROSS-REFERENCE

This application is a division of our copending application Ser. No. 829,285, entitled "Smoking of Food Products," and filed June 2, 1969 now U.S. Pat. No. 3,615,729.

BACKGROUND OF THE INVENTION

For centuries, the flavor of various food products has been enhanced by smoking the same. Generally, this involved subjecting the food product, such as cheese, fish, or meat, and products made from the foregoing, to a dense smoke aerosol generally obtained by the oxidation of hardwood.

In those food industries utilizing smoking as a means for flavoring various products, large smoke generating devices are utilized to heat sawdust which is generally formed of fairly finely divided wood bits from hardwood trees. In such operations, the sawdust will quite often be heated at some point in the smoke generating process to a glow point but normally, open combustion is undesirable.

The resulting smoke is then fed from the generator to a smokehouse in which the product may be placed to be subjected to the smoky atmosphere for a desired period of time.

Such smoke may be generally considered to consist of three different types of matter. The first is flyash which is relatively large in size and approaches the size of the sawdust particles being destructively distilled. The flyash quite normally is virtually pure carbon along with some residue contained in the wood that will not distill or combust in the smoke generator. Of course, the deposition of flyash on a product is to be avoided and generally, some steps are taken to remove the flyash from the smoke conveyed to the smokehouse. Typically, such means includes a trap through which the smoke passes at a relatively low velocity thereby enabling the flyash to settle out, or a large cyclone through which the smoke passes at a relatively low velocity which is just sufficient for the flyash to drop out of its entrained state in the smoke stream.

A second portion of the smoke is the visible, so-called "particulate" phase thereof which consists of relatively small particles of a colloidal size, which particles are generally composed of the higher boiling constituents of the smoke commonly known as "tars."

The third constituent of smoke is the vapor phase thereof. This phase is in a true vapor form as opposed to a colloidal form and it has been found that this phase principally contains the aromatic flavoring constituents which are desirably deposited on the product to give the product a characteristic smoke flavor.

The particulate phase or tars of smoke have been found to be relatively high in carcinogen content. A typical carcinogen found primarily in the particulate phase of smoke is 3:4 benzpyrene. As is well known, carcinogenic material, when present at sufficiently high levels, can induce cancer and there is increasing suspicion that even low levels of carcinogenic material can cause cancer after prolonged exposure thereto.

SUMMARY OF THE INVENTION

The invention concerns itself principally with the removal of carcinogenic material from smoke to be applied to food products without diminishing or altering the characteristic "smoked" flavor found in conventionally smoked products.

Furthermore, this invention concerns itself with the elimination of other problems long associated with the smoking of food products such as the maintenance of sanitary conditions and the fire hazards attendant a smoking process.

An exemplary embodiment of the invention includes a housing having a gas inlet and a smoke outlet. Within the housing, heating elements are arranged to define a heated, smoke regenerating zone and means are provided for introducing a liquid smoke composition into the heated zone for dispersal therein to result in a gaseous smoke composition which may be withdrawn through the smoke outlet and applied to food stuffs in the conventional manner.

Not only does the heat within the zone assist in dispersing the smoke through varpoization, but it has been found that, apparently due to a thermal cracking effect, the carcinogen content in the resulting smoke aerosol is less than that of the liquid smoke composition to be regenerated.

The invention also contemplates as part of the system apparatus for providing the liquid smoke composition for regeneration. This portion of the system includes a conventional smoke generator from which smoke is taken and fed through a relatively small cyclone at a velocity sufficient to remove a substantial portion of the particulate phase of the smoke, it having been discovered that the higher percentages of carcinogens in smoke are in the particulate phase at typical operating temperatures. The smoke from the cyclone is then condensed in a three-stage condensing unit and may be stored for a later regeneration, or possibly fed directly to the smoke generator for further carcinogen content reduction.

Other objects and advantages will become apparent from the following specification taken in conjunction with the accompanying drawings.

DESCRIPTION OF THE DRAWINGS

FIG. 2 is a vertical section of a smoke regenerating device which may be used in practicing the method illustrated in FIG. 1.

DESCRIPTION OF THE PREFERRED EMBODIMENTS

SMOKE GENERATION

Figure 1:
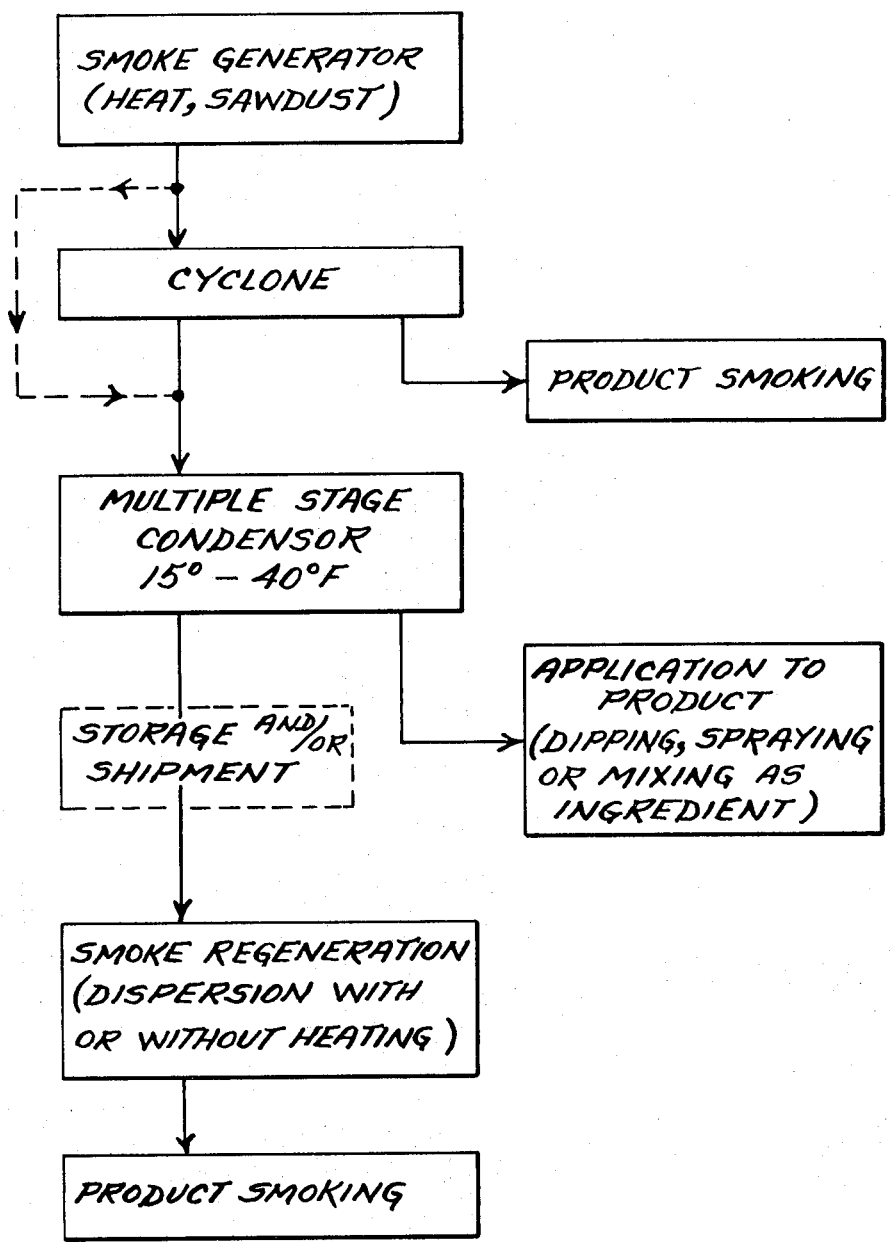
FIG. 1 is a flow diagram indicating the steps taken in practicing the invention.

In the method of generating a smoke aerosol according to the invention, a smoke generator 10 performs the first step in the method. The step of smoke generation can be performed by any suitable means known in the art and generally will consist of the destructive distillation of hardwood normally in the form of sawdust. Of course, woods other than hardwood could be used if they produce the desired smoke flavor in the final product.

As one example of suitable means by which the smoke may be generated, so-called "hardwood" sawdust was utilized in a commercially available Kartridge Pak smoke generator, Model No. 17, which includes three heated plates on which the sawdust is progressively heated. In the commercially available Kartridge Pak generator, the temperature of only the third and final plate is controlled. However, in order to take advantage of reproducibility flowing from other subsequent steps used in this invention, it may be desirable to modify such a generator by controlling the temperature of each of the three plates to insure that consistent smoke aerosol is generated. Normally, a plate temperature of around 750° F on all three plates will be suitable for purposes of this invention although it will be appreciated that variety of plate temperatures could be used.

CYCLONING THE SMOKE

The smoke produced by the smoke generator may then be fed through a cyclone 12 to effect removal of flyash entrained in the smoke as well as the carcinogen bearing tars found in the particulate phase of the smoke. The upper limit of the temperature at which the smoke aerosol produced by the smoke generation step is subjected to a cyclone 12 is somewhat critical to the removal of carcinogens but the lower limit need only be sufficiently high to preclude significant condensation in duct work. A temperature of at least 180° F is normally sufficient to preclude undesirable condensation.

To effect significant carcinogen removal, the temperature of the smoke when introduced into the cyclone should preferably not be higher than about 300° F. The significance of this figure becomes apparent when it is considered that the cycloning step removes a portion of the particulate phase of the smoke and the percent of the total smoke generated in the particulate phase at any given time depends upon the smoke temperature. For higher temperatures, many of the undesirable higher boiling tars will be vaporized and then become a portion of the gaseous phase of the smoke. Of course, the cyclone cannot effect a separation of gases and as a result, the higher the temperature of the smoke when subjected to the cyclone, the less carcinogenic material will be removed.

In terms of effecting the best temperatures so as to maximize carcinogen removal and yet preclude significant condensation of the smoke within duct work, it has been found that an optimum temperature range for the smoke upon its entry into the cyclone is on the order of 220°–230° F.

Other factors also have an effect on the separation of the particulate phase in the cycloning. For example, the concentration of the smoke will have an effect on the amount of coalescence of discrete particles and therefore on particle size. And of course, in a cyclone, the larger the particle size, the greater the separation efficiency.

Similarly, the flow rate of the smoke will have an effect on the separation. The flow rate must be sufficiently high with respect to the geometry of the cyclone so that the velocity of the smoke stream introduced into the cyclone is sufficient to cause the colloidal size particles in the particulate phase to be separated out. This is in contrast to heretofore known systems wherein cyclones have been used for the purpose of separating out flyash without separating out the particulate phase of the smoke.

Of course, cyclone size has an effect on separation. For relatively large cyclones such as those heretofore used in the separation of flyash, the velocities obtained within a cyclone are insufficient to cause the separation of the particulate phase of the smoke from the gaseous phase to any appreciable degree notwithstanding any of the foregoing factors. Thus, the cyclone should be extremely small so that high velocities may be obtained therein. As one example of a suitable cyclone which may be used in the method, it has been found that a so-called "4-inch cyclone" commercially available from the Dustex Corporation may be used with success without particular regard to the factors of concentration and flow rate which are extremely difficult to determine.

The operation of the cycloning step will become apparent from the following examples.

EXAMPLE I

Smoke was generated in a standard Kartridge Pak Model 17 generator operated at 2.75 rpm and which included at its output, a tar trap or pot having a standard draft opening so that the smoke generated was admixed with air. The smoke and air mixture was then conveyed through a two and ½ inch duct work to a 4 inch cyclone located approximately 10 feet away and the pressure drop across the cyclone was in the range from 1.0 to 1.25 inches of water. The smoke temperature at the cyclone was in the range of 180°–200° F. The emerging gaseous phase of the smoke together with that portion of the particulate phase which was not separated out was then condensed and analyzed for carcinogens and the resulting figure, when compared with smoke generated under similar conditions but not passed through the cyclone indicated that 70 percent of the carcinogenic material, measured in terms of the presence of 3:4 benzpyrene, was removed.

EXAMPLE II

Smoke was generated using three modified Kartridge Pak Model 17 generators wherein all three plates were controlled at a temperature of 750° F. All three generators were operated at 2.5 rpm and the resulting three streams were combined and fed directly to a 4 inch cyclone located 20 feet away through 2½ inch duct work without the admission of air. The temperature of the smoke at a tar trap located next to the generators was in the range of 350°–500° F and the pressure drop across the cyclone was 0.5–0.75 inches of water with the smoke emerging at a temperature in the range from 180°–230° F. Again, 70 percent of the carcinogens measured on the same basis were removed.

Depending upon production methods of those using a smoke aerosol made according to the invention, the outflow from the cyclone consisting of the gaseous phase of the smoke with or without entrained air and a small amount of the particulate phase of the smoke, may then be fed directly to a smokehouse for smoking of the product or, according to the preferred embodiment, utilized as the input material for the step of condensing, described hereinafter.

CONDENSING THE SMOKE

The smoke material emerging from the cyclone 12 and comprised primarily of the gaseous phase of the smoke with or without entrained air may then be fed to a multiple stage condenser 14. According to one embodiment of the invention, three stages of condensers are used with the first being water-cooled at about 40° F, the second being ammonia-cooled at a lesser temperature and the third being ammonia-cooled at a temperature of about 15°–20° F. Of course, a single condenser could be used and there is intended to be no restriction on the type of cooling, or the number of stages involved in the condenser. However, it is generally desirable to use a multiple stage system insofar as the constituents of the smoke flowing into the condensing system have different condensing temperatures and the possibility that those constituents condensing at a relatively higher temperature might not only proceed to the liquid phase but to the solid phase and thereby clogging of the condensing system is avoided. Specifically, through the use of multiple stages, liquified smoke fractions may be taken from each stage at a temperature above that at which they would cease to flow to preclude such clogging.

It is also desirable that the temperature of the final stage of the condenser be on the order of 15°–20° F as mentioned previously for the reason that such a temperature will effect condensation of 90–95 percent of the smoke aerosol.

Where multiple stages are used, the outlet streams may then be recombined to provide a liquid smoke composition virtually identical to the original smoke except, of course, for the lower content of carcinogenic material. However, depending upon the flavor desired to be imparted to a product, the various fractions need not be recombined but may be used separately. For example, in a comminuted meat product, use of the fraction obtained from a high temperature stage results in what may best be characterized as a "sweet" taste and as the temperature of the stage decreases to the lowest temperature, the taste of the comminuted meat product treated with the same will gradually go from the "sweet" taste to a so-called "phenolic" taste.

The smoke fractions emerging from the condenser may be separately or in recombined form used as an input material for the step of smoke regeneration as will hereinafter appear. Alternatively, the streams either separately or collectively may be used for product flavoring by application as liquid to the product. For example, the product may be dipped in the liquid smoke, sprayed with the liquid smoke, or the liquid smoke may be mixed in the makeup of the product as an ingredient. In the case of dipping and spraying, it may be desirable to dilute the liquid smoke as necessary to obtain desired flavor.

SMOKE REGENERATION

The liquid smoke obtained from the condenser system may be regenerated by dispersing the same by a smoke regenerator 16. The dispersion may be effected by any of a variety of mechanical means and once dispersed, a smoke aerosol suitable for smoking of a product is provided.

A further reduction in carcinogen content measured in terms of the presence of 3:4 benzpyrene may be effected during the smoke regeneration step if the dispersion takes place in a heated zone. The following examples illustrate the reduction.

EXAMPLE III

A condensed liquid smoke was "doped" to have a concentration of 3:4 benzpyrene of about 1.05 ppm to facilitate analysis. The same was mechanically vaporized in a zone at a temperature of about 400° F and the resulting smoke aerosol was then condensed and again analyzed for 3:4 benzpyrene which was found to be present at a level of 0.08 ppm.

EXAMPLE IV

Procedures of the foregoing example were repeated except that the zone temperature at which the dispersion took place was 600° F. The resulting smoke aerosol had a concentration of 3:4 benzpyrene of 0.06 ppm.

EXAMPLE V

The procedure of Example III was again repeated except that a zone having a temperature of 700° F was utilized. The resulting smoke aerosol had a 3:4 benzpyrene concentration of less than 0.01 ppm.

EXAMPLE VI

The procedure of Example III was again repeated except using a zone with a temperature of 800° F. The resulting smoke aerosol had a 3:4 benzpyrene concentration of about 0.01 ppm.

EXAMPLE VII

The procedure of Example III was again repeated utilizing a zone at a temperature of 825° F. The resulting smoke aerosol had a 3:4 benzpyrene concentration of about 0.02 ppm.

EXAMPLE VIII

A liquid smoke condensate "doped" to have a 3:4 benzpyrene level of 0.54 ppm was regenerated in a zone heated to a temperature of 225° F. The resulting smoke aerosol was condensed and analyzed for 3:4 benzpyrene. The analysis indicated that the regeneration process destroyed 56 percent of the 3:4 benzpyrene.

EXAMPLE IX

A condensed, cycloned liquid smoke containing 33.0 parts per billion (ppb) was regenerated by spraying the same at a plate heated to a temperature of 750° F to regenerate the same. After regeneration, the smoke aerosol was condensed and when analyzed was found to contain 1.67 ppb of 3:4 benzpyrene.

EXAMPLE X

Condensed, cycloned smoke containing 33.5 ppb of 3:4 benzpyrene was regenerated by spraying the same at a plate heated to 750° F to regenerate the same. Upon condensation, the regenerated smoke was found to contain 0.74 ppb of 3:4 benzpyrene.

When the regenerating procedure was attempted utilizing zone temperatures of 850° F and more, the liquid smoke burned with fire and flashing, and at a temperature on the order of 900° F, the dispersion was accompanied by an explosion.

The mechanism by which 3:4 benzpyrene concentration is reduced by dispersing in a heated zone is not fully understood but it is believed that a certain amount of thermal cracking takes place. That is, carcinogens such as 3:4 benzpyrene are broken down into compounds of lesser molecular weight which are not classified as carcinogens.

Furthermore, while it is not totally clear due to the inability of generating the smoke aerosol at temperatures of 850° F or more, the fact that such regeneration attempts resulted in combustion and the fact that a slight upswing was noticed in the 3:4 benzpyrene concentration at zone temperatures of about 700° F, it is also considered that at temperatures higher than 850° F, formation of 3:4 benzpyrene may actually be encouraged due to combustion of the liquid smoke.

Suitable means for regenerating smoke by dispersing the same in a heated zone will be described in greater detail hereinafter.

SMOKING OF THE PRODUCT

The regenerated smoke having a low carcinogen content may then be directed to a smoke house 18 for smoking products in any suitable manner.

EXAMPLE XI

Various cycloned, condensed liquid smoke compositions having an average 3:4 benzpyrene level of 32.9 ppb were regenerated in the manner generally described in Examples IX and X above and were applied to all beef franks in a conventional smoke house in a conventional manner. The resulting smoked franks were then analyzed to determine the extent of deposition of 3:4 benzpyrene using analysis techniques having a detection limit of 0.37 ppb of 3:4 benzpyrene. No 3:4 benzpyrene was detectable on the franks thereby indicating that the level of the same on the smoked franks was less than 0.37 ppb.

SMOKE GENERATOR STRUCTURE

One form of a smoke generating device which may be used in practicing the method of smoked air according to the invention is illustrated in FIG. 2 and is generally designated 30. The smoke generator 30 includes a base plate 32 which is centrally apertured at 34 to provide an air or inert gas inlet 36.

The base 32 mounts a rectangular housing section 38 which has its upper end terminating in a truncated pyramid section 40. The truncated pyramid section 40, in turn, terminates in a square to round transition section 42, the upper end of which is connected to a tee 44 having one and blocked by a plate 46 so that the tee 44 serves as an elbow.

The plate 46 includes an aperture 48 through which an elongated pipe 50 extends. A collar 52 is welded to the upper surface of the plate 46 and includes a central aperture 54 which is aligned with the aperture 48 to receive the pipe 50. A set screw 56 is associated with the collar 52 and the aperture 54 so that the vertical position of the pipe 50 may be set as desired.

At approximately the junction of the truncated pyramid section 40 and the square to round transition section 42 there is provided a sleeve 58 which surrounds the pipe 50. Spacing means 60 connected to the inner wall of the square to round transition section 42 centrally locate the sleeve 58.

At the lower end of the pipe 50 there is located a conventional spray head 62 which is adapted to have a spray pattern as indicated by the dotted lines 64.

The spray pattern 64 is within a heated zone defined by a metal box, generally designated 66. The metal box 66 is comprised of four side plates 68 (only three of which are shown) and a bottom plate 70. Electrical strip heaters 72 are in contact with the outermost sides of the plates 68 and 70 and held in such a position by clamping plates 74 mounted to the plates 68 and 70 by means of threaded members 76 welded to the plates 68 and 70 and bearing nuts 78.

Leg means 80 elevate the box 66 and the strip heaters 72 associated therewith above the base plate 32. Suitable securing means, generally designated 82, are used to secure the leg means to the base 32 to center the box 66 within the rectangular housing portion 38.

A temperature sensor (not shown) may be mounted by any suitable means (not shown) within the zone defined by the box 66. Through any conventional control circuit, the temperature sensor may be utilized to control the flow of electrical current to the strip heater 72 to provide control of the temperature within the zone defined by the box 66.

The pipe provides a conduit for liquid smoke to the spray head 62 so that the same may be dispersed through the heating zone defined by the box 66. Control of the flow of the liquid smoke may be exercised by providing a constant pressure pump means 90, which can be of a mechanical nature or a fluid nature, in communication with a reservoir 92 containing the liquid smoke. A line 94 is in fluid communication with the pipe 50, the liquid reservoir 92 and the pump means 90 and for controlling the flow of liquid smoke therein, there may be provided a metering valve 96 and a pressure gauge 98. The rate of flow of the liquid smoke to the spray head 62 may then be regulated by appropriate adjustment of the metering valve 96 with the pressure gauge 98 providing an indication of the pressure drop across the metering valve 96 and thus, an indication of the flow rate.

In use, the smoke generator will be preheated by the strip heater 72 so that the plates 68 and 70 defining the heated zone, are heated thereby to a desired temperature. After the desired temperature of the heated zone is attained, the spray system may be activated to cause liquid smoke to be dispersed and vaporized within the heated zone. Air or an inert gas is permitted to flow into the smoke generator through the pipe 36, beneath the plate 70, and along the sides of the plates 68 and upwardly and outwardly of the open end of the tee 44 from which it may then be conveyed to a smokehouse for smoking the product. In such an operation, it is desirable that the flow rate of the liquid smoke to the spray head 62, and the temperature of the heated zone defined by the box 66 be such that the dispersed liquid smoke will be completely vaporized before it impinges upon the plates 68 and 70.

SUMMARY

From the foregoing, it will be appreciated that smoke generation according to the invention provides a number of advantages. For example, the cycloning step requires very little additional equipment than that heretofore used and with the capability of reducing the carcinogen content of smoke by 70 percent. As pointed out previously, the smoke from the cycloning may be, if desired, fed directly to a smokehouse for the smoking of a product.

Alternatively, and more preferably the smoke from the cycloning may be condensed to a liquid form which may then be stored and/or transported to a remote food processing site for regeneration thereby enabling the construction of a single plant for the purposes of smoke generation so that the smoke generation operation can be removed from the food processing plants. Accordingly, the attendant fire hazards and sanitation problems in a food processing plant can be avoided.

Regeneration of liquid smoke according to the invention by dispersing the same in a heated zone provides for further carcinogen removal if desired. Of course, if additional carcinogen removal is not required, dispersion need not take place in a heated zone and in either case the advantages of eliminating the fire hazards and unsanitary conditions are still present.

As another alternative, the cycloning step may be omitted and if the smoke is then condensed, the advantages of elimination of the fire hazard and the unsanitary condition may still be present and, if desired, carcinogen removal can be effected solely by regeneration by dispersion in a heated zone.

Finally, the liquid smoke obtained from the condensation process need not be regenerated if desired, but may be added directly with or without dilution to the food product to be processed in a variety of known ways to arrive at a product having the characteristic smoked taste.

We claim:

1. A smoke regenerating apparatus comprising: a housing having an interior, a gaseous smoke outlet in said housing and adapted to communicate with product smoking means, a gas inlet in said housing, a liquid smoke composition inlet in said housing, heating means within said housing for elevating the temperature of at least a portion of the interior thereof, liquid dispersing means in said housing and in fluid communication with said liquid smoke composition inlet and for dispersing a liquid smoke composition in at least said portion, and means for directing a liquid smoke composition to said liquid smoke composition inlet, said gas inlet and said smoke outlet being located at opposite positions within said housing, said liquid smoke composition inlet being directed toward said gas inlet.

2. A smoking system comprising: a smoke generator for generating smoke from wood; a cyclone receiving smoke from said smoke generator, said cyclone being of size to separate a portion of the particulate phase of smoke from the gaseous phase thereof; a condensing system receiving the smoke other than said portion from said cyclone for condensing the smoke from a gas to a liquid, a smoke regenerator means receiving liquid smoke from said condensing system, said regenerating means including a regenerating zone, means for heating the zone, and means for dispersing liquid smoke in the zone; and products smoking means receiving the regenerated smoke from the regenerator for smoking food products.

* * * * *